(12) United States Patent
John et al.

(10) Patent No.: US 9,298,856 B2
(45) Date of Patent: Mar. 29, 2016

(54) INTERACTIVE DATA EXPLORATION AND VISUALIZATION TOOL

(75) Inventors: Jerry John, Bangalore (IN); Kaushik Kohli, Bangalore (IN)

(73) Assignee: SAP SE, Walldorf (DE)

(*) Notice: Subject to any disclaimer, the term of this patent is extended or adjusted under 35 U.S.C. 154(b) by 815 days.

(21) Appl. No.: 13/453,439

(22) Filed: Apr. 23, 2012

(65) Prior Publication Data

US 2013/0282696 A1    Oct. 24, 2013

(51) Int. Cl.
*G06F 7/00* (2006.01)
*G06F 17/30* (2006.01)

(52) U.S. Cl.
CPC ...... *G06F 17/30991* (2013.01); *G06F 17/3053* (2013.01); *G06F 17/30554* (2013.01); *G06F 17/30864* (2013.01)

(58) Field of Classification Search
CPC .......... G06F 17/3053; G06F 17/30554; G06F 17/30864
USPC .......................................... 707/722
See application file for complete search history.

(56) References Cited

U.S. PATENT DOCUMENTS

| | | | |
|---|---|---|---|
| 6,853,998 B2* | 2/2005 | Biebesheimer et al. | 707/765 |
| 2002/0152190 A1* | 10/2002 | Biebesheimer et al. | 707/1 |
| 2007/0276801 A1* | 11/2007 | Lawrence et al. | 707/3 |
| 2007/0282797 A1* | 12/2007 | Wang et al. | 707/3 |
| 2008/0077558 A1* | 3/2008 | Lawrence et al. | 707/3 |
| 2008/0281794 A1* | 11/2008 | Mathur | 707/3 |
| 2009/0222329 A1* | 9/2009 | Ramer et al. | 705/10 |
| 2009/0322790 A1* | 12/2009 | Behar et al. | 345/659 |
| 2011/0252014 A1* | 10/2011 | Mital et al. | 707/706 |
| 2011/0258049 A1* | 10/2011 | Ramer et al. | 705/14.66 |
| 2012/0069131 A1* | 3/2012 | Abelow | 348/14.01 |
| 2012/0173358 A1* | 7/2012 | Soroca et al. | 705/26.3 |
| 2013/0275422 A1* | 10/2013 | Silber et al. | 707/728 |

* cited by examiner

*Primary Examiner* — Mark E Hershley
(74) *Attorney, Agent, or Firm* — Brake Hughes Bellermann LLP

(57) ABSTRACT

A computer-implemented method for data visualization includes determining a query context for a user's search query, and retrieving relevant data for the query context. The method combines the relevant data with data that is filtered according to search parameters in the user's search query. The method further includes generating an interactive presentation to display the combined data from the perspective of the user's search query or from the perspectives of other entities.

20 Claims, 13 Drawing Sheets

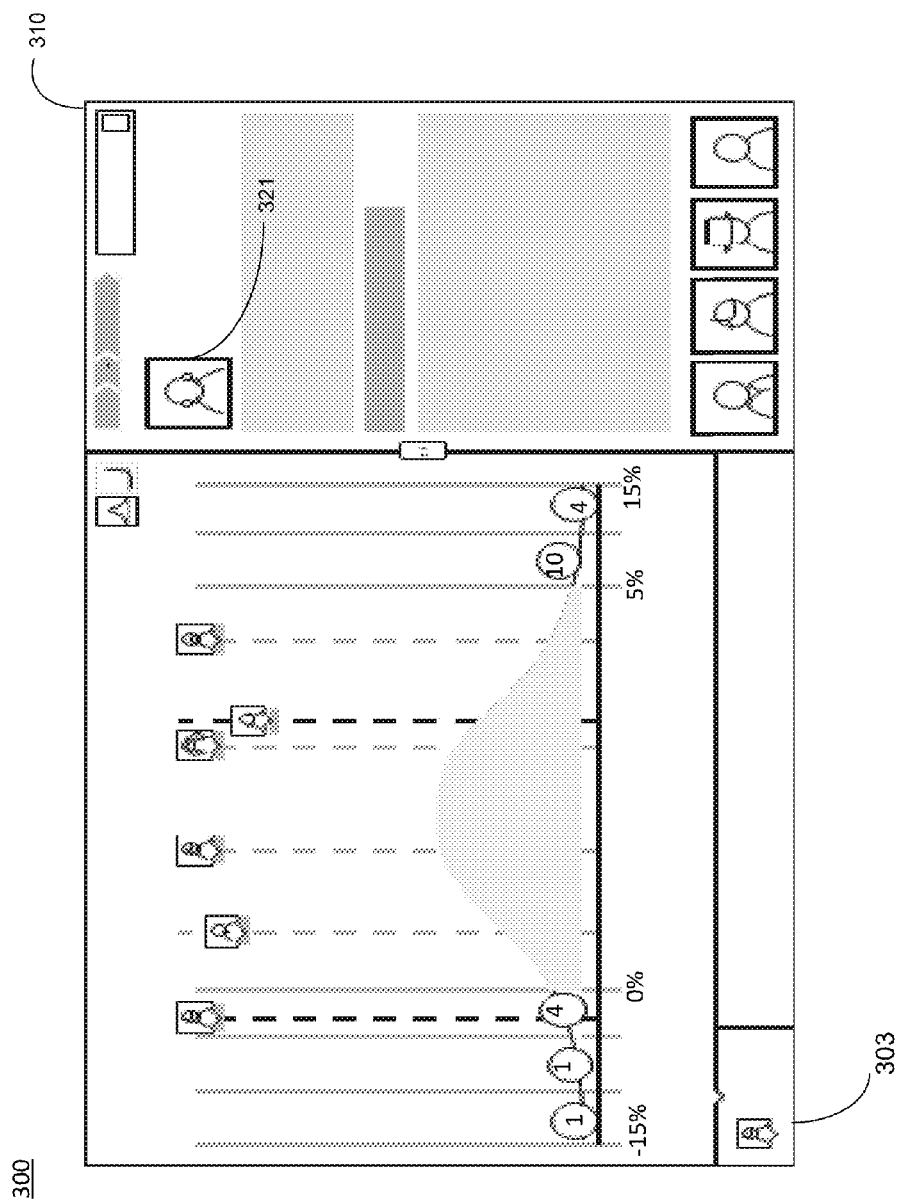

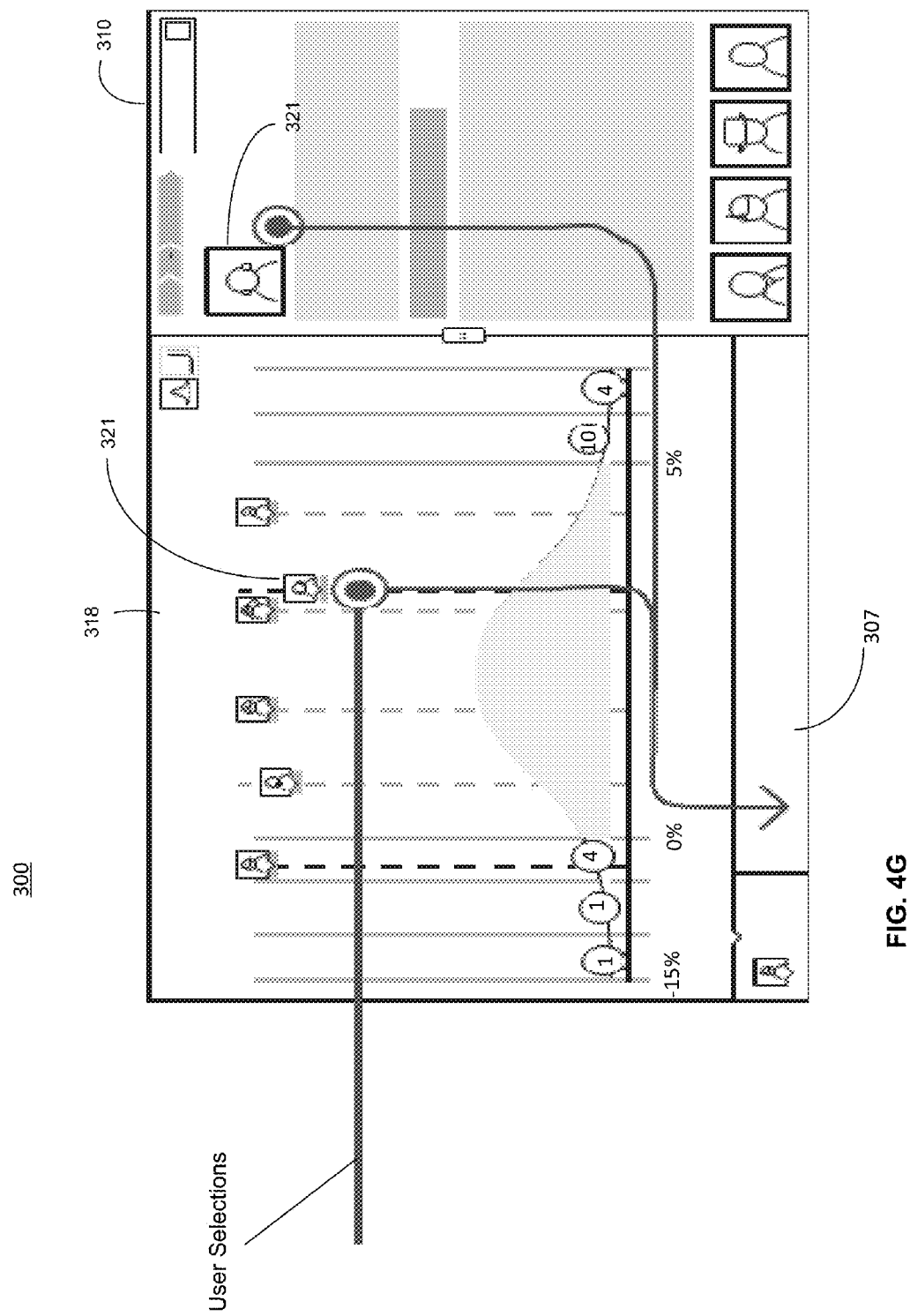

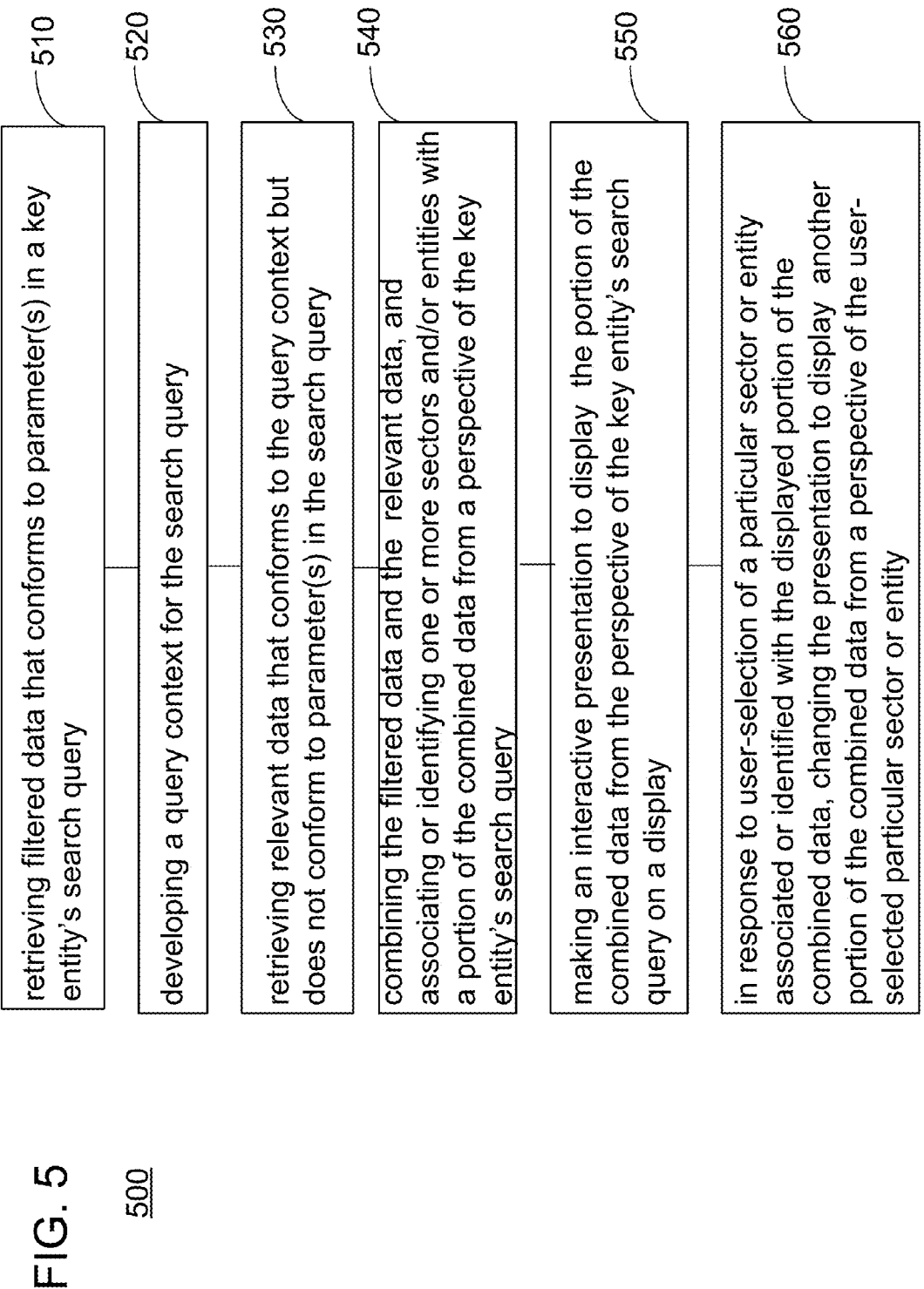

INTERACTIVE DATA EXPLORATION AND VISUALIZATION TOOL

TECHNICAL FIELD

This description relates to data visualization and presentation tools on computer systems.

BACKGROUND

Home and business users utilize computer applications (e.g., financial software search engines, etc.) to seek data or information in personal and business contexts. A user may query an electronic database or search a web site in a context, for example, seeking information to address a problem or issue (hereinafter, for convenience in description, the terms "query", "search" and "search query" may be used interchangeably). In response to the user's search query seeking information to address the problem or issue, data is extracted from a data set and returned or displayed to the user. There is a one-to-one correspondence between the data returned or displayed and the parameters in the search query submitted by the user. In conventional electronic or web search paradigms, there may be no interpretation or recognition of the context, problem or issue motivating the user's search query. The data returned or displayed to the user may include only data that has been filtered using parameters of the search query submitted by the user. For example, a user, in the context of looking to buy a car in general, may submit search parameters (e.g., color, engine type, and price) for the car in an Internet search engine as: color—red; engine type—diesel-powered; and price—less than 15,000 Euros. In response, search results returned or displayed to the user by the Internet search engine may be strictly limited to red cars with diesel-powered engines that are priced less than 15,000 Euros, without recognition of the context of the search query that the user is looking to buy a car in general.

Consideration is now being given to computer solutions that can intelligently recognize from a user query or search, problems or issues for which the user is seeking information and present data accordingly. Attention is also directed to user interfaces (UI) for such computer solutions.

SUMMARY

A data visualization solution is hosted on at least one computer host and linked to at least one data set. The data set(s) may reside in the computer host(s) and/or in external centralized or distributed databases. Each host computer's infrastructure may include, for example, one or more physical machines, virtual machines, central processing units, disk drives and other resources, distributed over diverse locations or nodes connected by a network.

In response to an initial user query, the data visualization solution selects and prepares presentation data for display to the user. The presentation data includes filtered data that is filtered from a data set according to parameters of the initial user query. The data visualization solution further recognizes or develops a query context of the initial user query. The data visualization solution retrieves or receives relevant data related to the query context, and includes this relevant data in the presentation data. A user interface, which is coupled to the data visualization solution, is configured to invite and allow the user to interactively explore the presentation data, which includes both the filtered data and the relevant data. In particular, the user interface is configured to invite and allow the user to interactively explore the presentation data from more than one perspective.

BRIEF DESCRIPTION OF THE DRAWINGS

FIGS. 4A-4I are schematic illustrations of interactive data presentations on a user interface, in accordance with the principles of the disclosure herein.

FIG. 5 is a flow chart of an example data visualization and exploration method, in accordance with the principles of the disclosure herein.

Like reference symbols in the various drawings indicate like elements.

The details of one or more implementations are set forth in the accompanying drawings and the description below. Other features will be apparent from the description and drawings, and from the claims.

DETAILED DESCRIPTION

A data visualization solution may be hosted on at least one physical and/or virtual computer that is linked or networked to a user interface, in accordance with the principles of the disclosure herein. The data visualization solution may be configured to make an interactive graphical representation of data and information on the user-interface.

In response to a user's search query, the data visualization solution may determine a query context for the search query. The data visualization solution may retrieve or receive filtered data that conforms to a filter parameter(s) in the user's search query from a data set. The data visualization solution may also retrieve or receive relevant data that may not strictly conform to the filter parameter(s) in the user's search query, but conforms to the query context. The data visualization solution may combine the filtered and relevant data for an interactive presentation on the user interface. In the interactive presentation, the data visualization solution may display a portion of the combined data from a perspective of the user's search query. Further, the data visualization solution may associate at least a sector and/or entity with the portion of the combined data from a perspective of the user's search query that may be displayed in the interactive presentation.

In response to every user-selection of a particular sector or entity associated with the displayed portion of the combined data, the data visualization solution may interactively change the presentation to display a new portion of the combined data from a perspective of the user-selected particular sector or entity. The data visualization solution may associate at least a sector and/or entity with the new portion of the combined data displayed. Further, for every user-selection of a sector or entity associated with the new portion of the combined data displayed, the data visualization solution may interactively change the presentation to display a further new portion of the combined data from a perspective of the newly selected sector or entity. In this manner, the data visualization solution may allow the user to explore the combined data from the perspectives of different sectors or entities.

Figure 1:
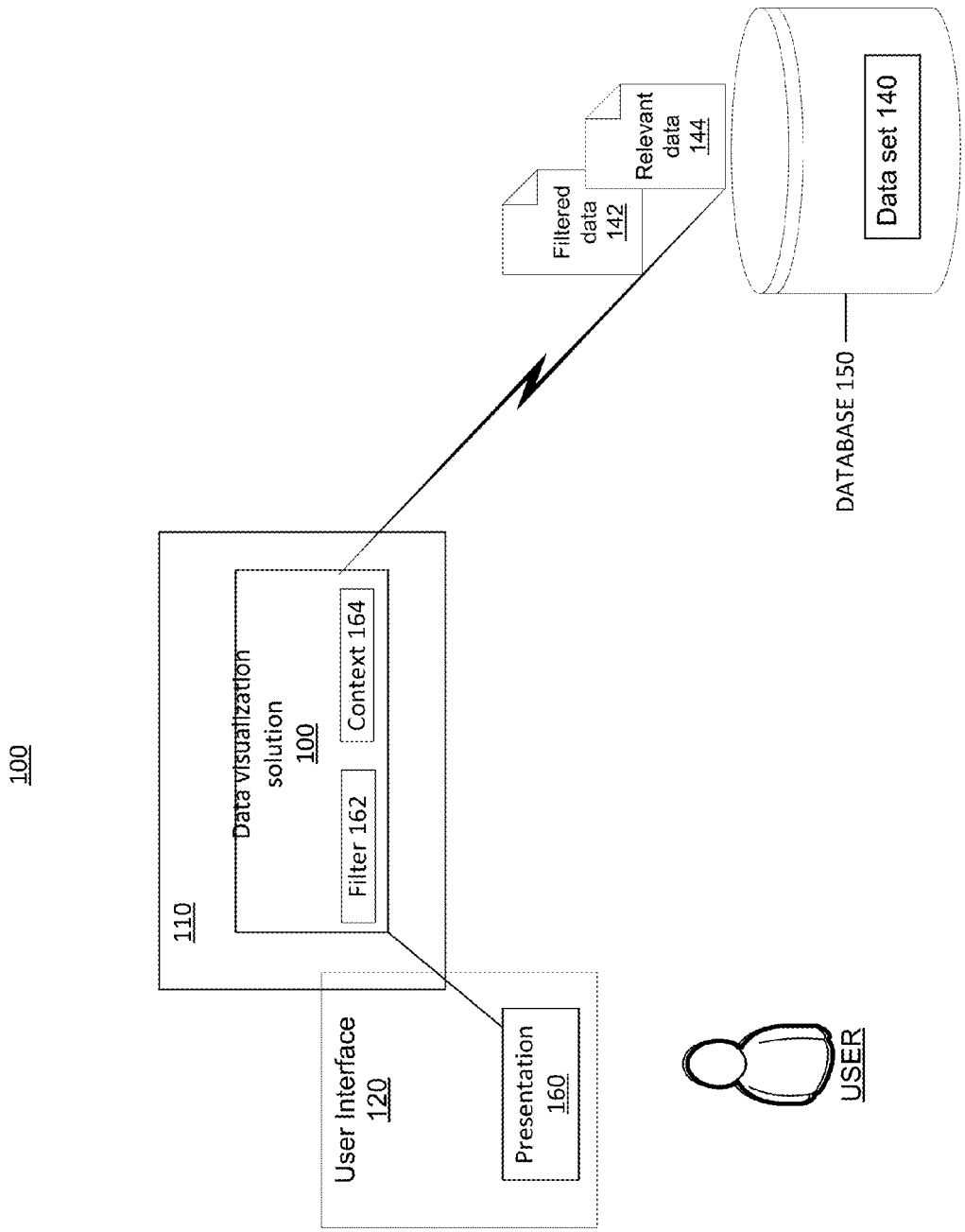
FIG. 1 is a block diagram illustrating deployment of a data visualization solution for interactive data exploration and visualization, in accordance with the principles of the disclosure herein.

FIG. 1 shows an example data visualization solution 100 that is configured to make a presentation 160 on a user interface 120. Data visualization solution 100 may be may be hosted on one or more physical and/or virtual computers. In particular, FIG. 1 shows data visualization solution 100 hosted, for example, on a physical computer 110. User-interface 120 may reside on one of the computers hosting data visualization solution 100 or in a different computer or device (e.g., a terminal or display, mobile device, cell phone, tablet, net book, etc.), which is communicatively linked (e.g., via the Internet or other network) to data visualization solution 100. Data visualization solution 100 may be configured to access at least one data set (e.g., data set 140), which may reside in one or more data stores (e.g., in computer memory, internal or external data bases, etc.). FIG. 1 shows, for example, data set 140 residing a database 150, which is communicatively linked to computer 110.

Data visualization solution 100 may be configured to select and prepare portions of data set 140 for interactive presentation to a user. Data visualization solution 100 may, for example, be configured to make an interactive presentation 160 on user interface 120 in response to a user query. The user query may have been submitted by the user, for example, through user interface 120 or via another input device. The user query may include search criteria or parameters (hereinafter "filter 162"). Data visualization solution 100 may apply filter 162 to retrieve or receive filtered data 142 that matches or conforms to filter 162 exactly, from data set 140.

Data visualization solution 100 may be further configured to determine a context 164 for the user query, for example, by relaxing, broadening, or loosening filter parameters in the user's search query. Context 164 may include relaxed filter 162 parameters designed capture a range or extent of information relevant to the user query. The range or extent of context 164 may be determined by data visualization solution 100 automatically based on the user's query parameters. For example, for a search query for a red car, data visualization solution 100 may automatically relax the search to include all colors of cars. Alternatively or additionally, data visualization solution 100 may use learning algorithms to learn the range or extent of context 164, for example, from other users' queries directed to data set 140 or other data sets. Further, the range or extent of context 164 may be limited or determined based user-selected context criteria. The user-selected context criteria may, for example, allow access to information on electronic or Internet networks (e.g., social networks, professional networks, or other networks) to which the user belongs.

Data visualization solution 100 may use context 164 to retrieve or receive relevant data 144 from data set 140 that does not match filter 162 parameters exactly, but which matches or conforms to context 164 parameters.

Figure 2:
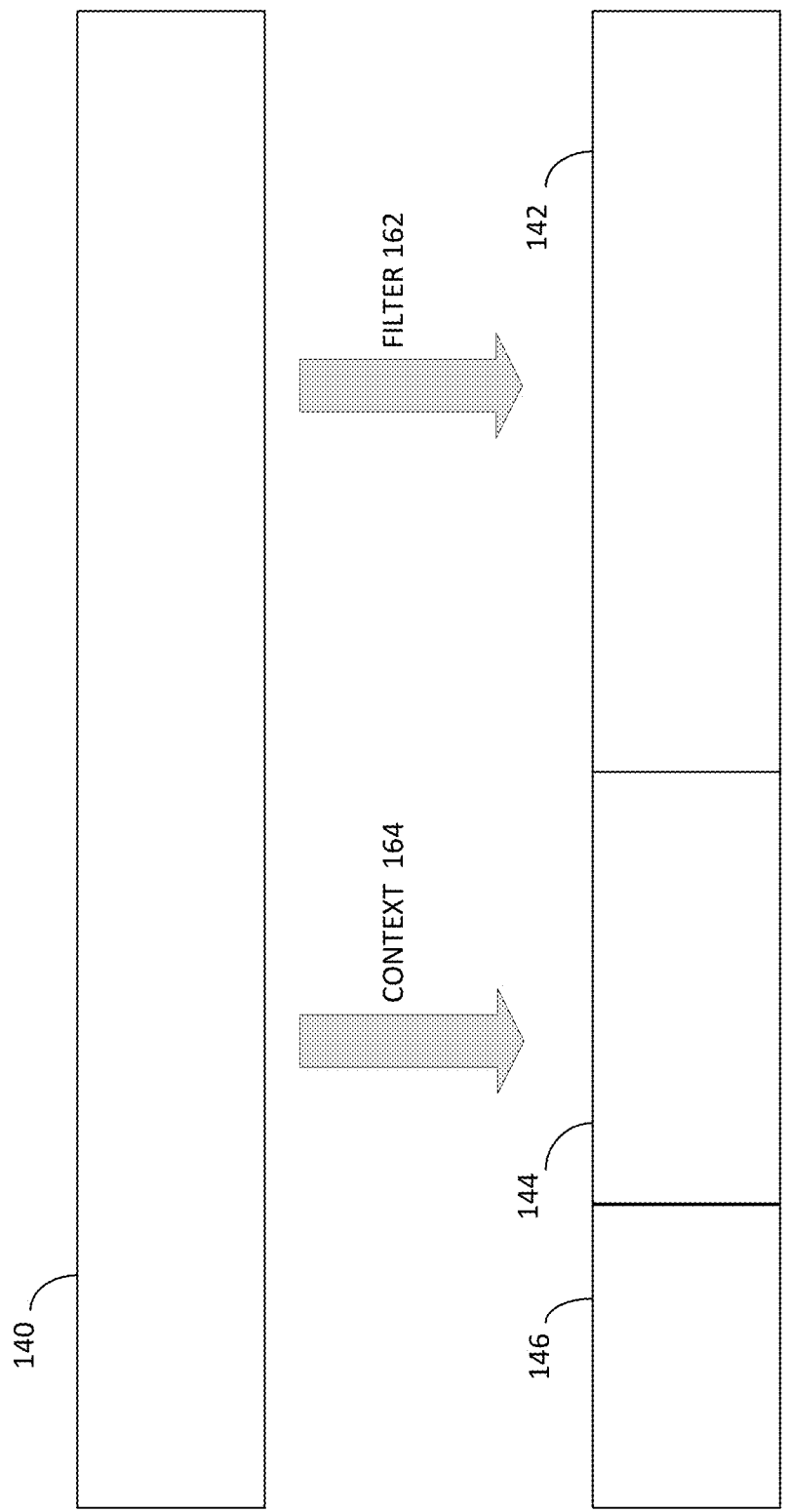
FIG. 2 is a schematic block diagram illustrating application of a query filter and a query context to retrieve data from a data set, in accordance with the principles of the disclosure herein.

FIG. 2 schematically shows a relationship between data set 140, filter 162, filtered data 142, context 164, relevant data 144 and unmatched data 146.

Data set 140 may, for example, be a large or complex data set or a small and simple data set. In any case, data set 140 includes "unfiltered information" without any filters or restrictions applied to it. Applying a filter (e.g., filter 162 according to the user's query) to this data set 140, results in a data subset (e.g., filtered data 142) that strictly matches the filter parameters. Under search and filter paradigms of conventional "search query" or "find" tools, only data 142 would displayed to the user in the response to the user query. Strictly applying filter 162 does not pick up information or data that does not meet filter 162 parameters exactly, but may still be relevant to the user's query. Applying context 164 parameters to data set 140 results in a data subset (e.g., relevant data 144) that matches or conforms to context 164 parameters even if it (data subset) does not match filter 162 parameters exactly. In accordance with the principles of the disclosure herein, this relevant data 144 may also be presented to the user, in addition to filtered data 142, in response to the user query (e.g., by data visualization solution 100).

In the example (mentioned in the Background section herein) of the user looking to buy a car generally, filtered data 142 may include only information on cars that meet filter parameters exactly, i.e. red cars with diesel-powered engines that are priced less than 15,000/-Euros. In contrast with a context perspective of "any color car," relevant data 144 may, for example, include information on cars that are have a Summer Copper color (which is not red, but still a warm color) and is priced 18,500/-Euros (only 500 Euros more expensive).

With renewed reference to FIG. 1, data visualization solution 100 may be configured to display relevant information (i.e. relevant data 144) that may be based on context 164 in presentation 160 on user interface 120. User interface 120/ presentation 160 may be further configured to allow the user to interactively explore the relevant information that may be based on context 164. In particular, user interface 120/presentation 160 may allow the user to interactively explore and compare the relevant information from the user's own perspective and from other entities perspectives (e.g., other users, objects, or concepts' perspectives). The other entities whose perspectives may be included in presentation 160 may be selected by data visualization solution 100 based upon characteristics (e.g., context 164) of the user's query. For example, if the user's query relates to retail markets, user interface 120/presentation 160 may allow user comparison of vendors or products. If the user's query relates to work force planning, user interface 120/presentation 160 may, for example, allow user comparison of productivity and profitability by employee. If the user-selected context criteria for the user's query allow access to information on social or professional networks to which the user belongs, user interface 120/presentation 160 may allow user comparison of data from the perspectives of individuals or entities on the social or professional networks.

User interface 120 may include suitable controls to facilitate user interaction and navigation through the relevant information in presentation 160. User interface 120/presentation 160 may, for example, include graphical user elements (e.g., radio buttons, check lists, checkboxes, select lists, menus, etc.) that allow the user to toggle between views of the relevant information from one perspective to that from another perspective, or compare views from different perspectives.

For convenience in description, the term "entity" may be used herein as a nominative name to refer to a corresponding data entity. Thus, it will be understood, for example, that entity "user xxx" may refer to a user or to data which is identified or associated with user xxx, and that entity "market sector yyy" may refer a market sector or to data which is identified or associated with market sector yyy, as may be appropriate in context. Further, it will be understood that the terms "entity" and "user" may be used interchangeably herein.

Figure 3:
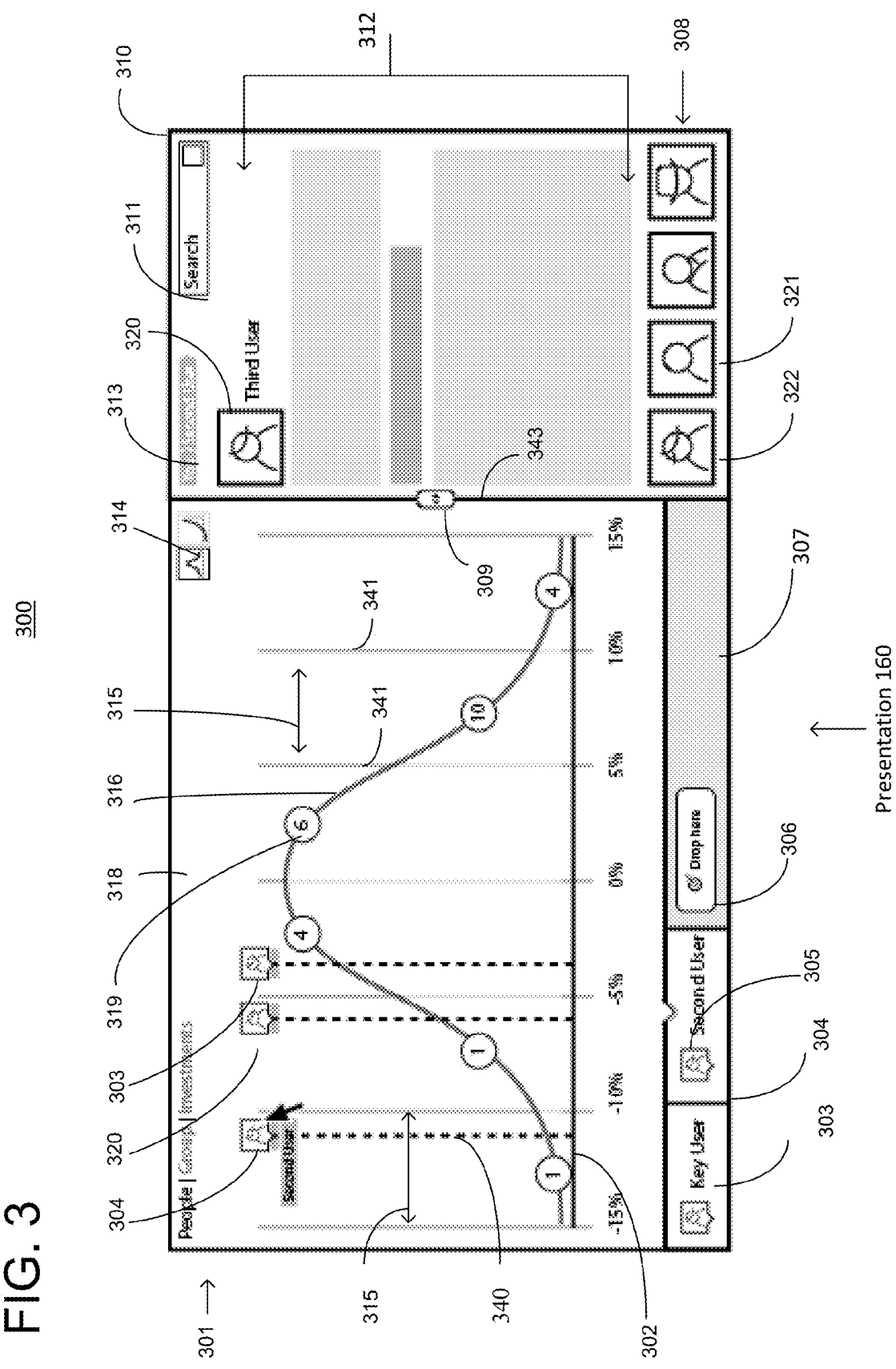
FIG. 3 is a schematic illustration of an interactive data presentation on a user interface, in accordance with the principles of the disclosure herein.

FIG. 3 shows an example user interface 300 (UI 300), which may include suitable graphical user elements and controls (e.g., elements 301-314) that allow a viewer to explore presentation 160 from various perspectives of different entities. Entities, whose perspectives may be included in presentation 160, and which the viewer may consider in exploring presentation 160 may, for example, include any animate or inanimate object or concept (e.g., users, vendors, products, companies, geographies, market sectors, etc.) as may be appropriate in context. The entities whose perspectives may be considered in exploring presentation 160 can be individuals or entities in an electronic or Internet network (e.g., a social network, a professional network or other network). For convenience in description, example UI 300 is described herein in social networking contexts in which participating individuals often compare and share information with each other. However, it will be understood that neither UI 300 nor data solution 100 are limited to social networking contexts.

With reference to FIG. 3, UI 300 may include a main area 318 for displaying a data portion of presentation 160, and a panel 310 for displaying status and other information (e.g., entity profiles) related to the data portion displayed in main area 318.

Further herein, elements of UI 300 are described using an example presentation 160, which may have been prepared by data visualization solution 100 in response to a key user's search query for investment results in various stock market sectors (e.g., a search query for market sectors having investment results greater than a certain x=0%). Example presentation 160 prepared by data visualization solution 100 may include not only filtered data 142 (i.e., information on investment results by market sector) in response to the user's search query, but also relevant data 144 (e.g., information on investment results of people on social networks, investment results of groups, and investment results by styles of investment, etc.) that may have been obtained by data visualization solution 100 by using a query context.

With renewed reference to FIG. 3, main area 318 may include a graphical user element 301 that, for example, may allow user selection of a view type (e.g., People, Group and Investments) of presentation 160, and a graphical user element 314 that may allow user selection of styles or formats of data display (e.g., a bell-shaped graph, or an exponential graph). FIG. 3 shows, for example, a 'People' view type, in which the data portion displayed in main area 318 includes information on investment results of individual entities (e.g., key user 302, second user 304, third user 320, etc.) on a social network. In the example shown, the data portion of presentation 160 is displayed as a bell-shaped graph 316 over six market sectors 315 having investment results ranging from −15%-+15% as indicated along a horizontal axis 302.

Appropriate symbols or markers may be used in graph 316 as visual aids for ease in identification of entities and data that are included in presentation 160 and whose perspectives are available for viewing or comparison by a user. For example, in graph 316 shown in FIG. 3, symbols or markers (e.g., vertical lines 341, counters 319 and vertical lines 340) are used as visual aids for ease in identification of six stock market sectors 315, the number of individual entities in each of six stock market sectors 315, whose investment results are available for viewing or comparison by the user, and the investment results of individual entities. As shown in the figure, for ease in visual identification, six stock market sectors 315 are marked as being separated by vertical lines 341 at about 5% intervals ranging from −15% to +15% along horizontal axis 302. Filtered data 142 (i.e. three market sectors with investment results greater than a certain x=0%)) and relevant data 144 (i.e. three market sectors with investment results less than a certain x=0%) are shown on positive (>0%) and negative (<0%) segments of horizontal axis 302, respectively. Counters 319 may display numeric values for the number of entities whose investment results are included in graph 316. In the example shown, six counters 319 placed in six sectors 315 along bell-shaped graph 316 display numeric values 1, 1, 4, 6, 10 and 1 as the number of entities whose investment results in respective stock market sectors 315 are included in graph 316. Further, in graph 316 shown in FIG. 3, for ease in visual identification, the investments results of three individual users (key user 303, second user 304, and third user 320) are marked along horizontal axis 302 by dashed vertical lines 340, which are topped with corresponding user icons.

Further, main area 318 may include a compare bar 307, which displays tabs or icons representing entities (e.g., key user 303, second user 304, etc.) from whose perspectives a viewer may view or compare data in presentation 160. A key user 303 tab or icon may always be present on compare bar 307 as the logged-in user or viewer. Compare bar 307 may include a sliding active compare pointer 305, which may indicate a current or active view of the comparison. In the example shown, active pointer 305 rests on second user 304 tab indicating that the active view of data in graph 316 is from the second user's perspective. To change the current view of data in graph 316 to that from the perspective of the different user tab, The viewer may move or slide active pointer 305 to rest on the different user tab (e.g., key user 302 icon) in compare bar 307. Further, compare bar 307 may include a drop zone 306 at which the viewer can drag-and-drop a selected entity's icon to view graph 316 from that entity's perspective. The viewer may, for example, select and drag an entity's icon from main area 318 (or panel 310) and drop the entity's icon in zone 306 to view data from that entity's perspective.

Panel 310, which is configured to display a status and other information (e.g., entity profiles) related to the data portion displayed in main area 318, may include a header 312 that indicates a view type selected for main area 318 by a user. In the example shown, header 312 indicates a default 'Search' view type selected by the user. Further, a relationship indicator 313 in panel 310 may indicate the relationship between the user and other entities in presentation 160, for example, by using sequential named tabs. In FIG. 3, tabs for only two entities (e.g., 'You' and 'Second User') are shown. However, it will be understood that relationship indicator 313 may show any number of related entities using, for example, named tabs, drop down menus, or other graphical elements.

Further in panel 310 of UI 300, an entities bar 308 may list selectable entities (e.g., user 320, user 321, etc.) that have associated data available in presentation 160 for viewing or comparison by the viewer. Bar 308 may include a drop down menu, tabs, or other suitable graphical elements for listing the selectable entities. Upon selection of an entity (e.g., third user 320, market sector 315, etc.) by a user, UI 300 may be configured to provide information on the selected entity in information area 312 of panel 310. If for example, the selected entity is third user 320, the information that is provided in information area 312 may include third user 320 icon and a descriptive profile (e.g., name, investment style, etc.) (not shown). If the selected entity is a stock market sector 315, information area 312 may list all individual entities in stock market sector 315, whose investment results are available for viewing or comparison by the user (not shown).

In UI 300, panel 310 may have a movable edge 343 so that a size of information area 312 can be reversibly changed by the user to allow display of more or less information. Movable edge 343 may have an attached handle 309, which the user may hold and pull to move edge 343 to increase or decrease the size of information area 312.

FIGS. 4A-4I shows an example interactive operation of UI 300 by a viewer (e.g., key user 302) to explore data in presentation 160 from various views or perspectives.

Figure 4A:
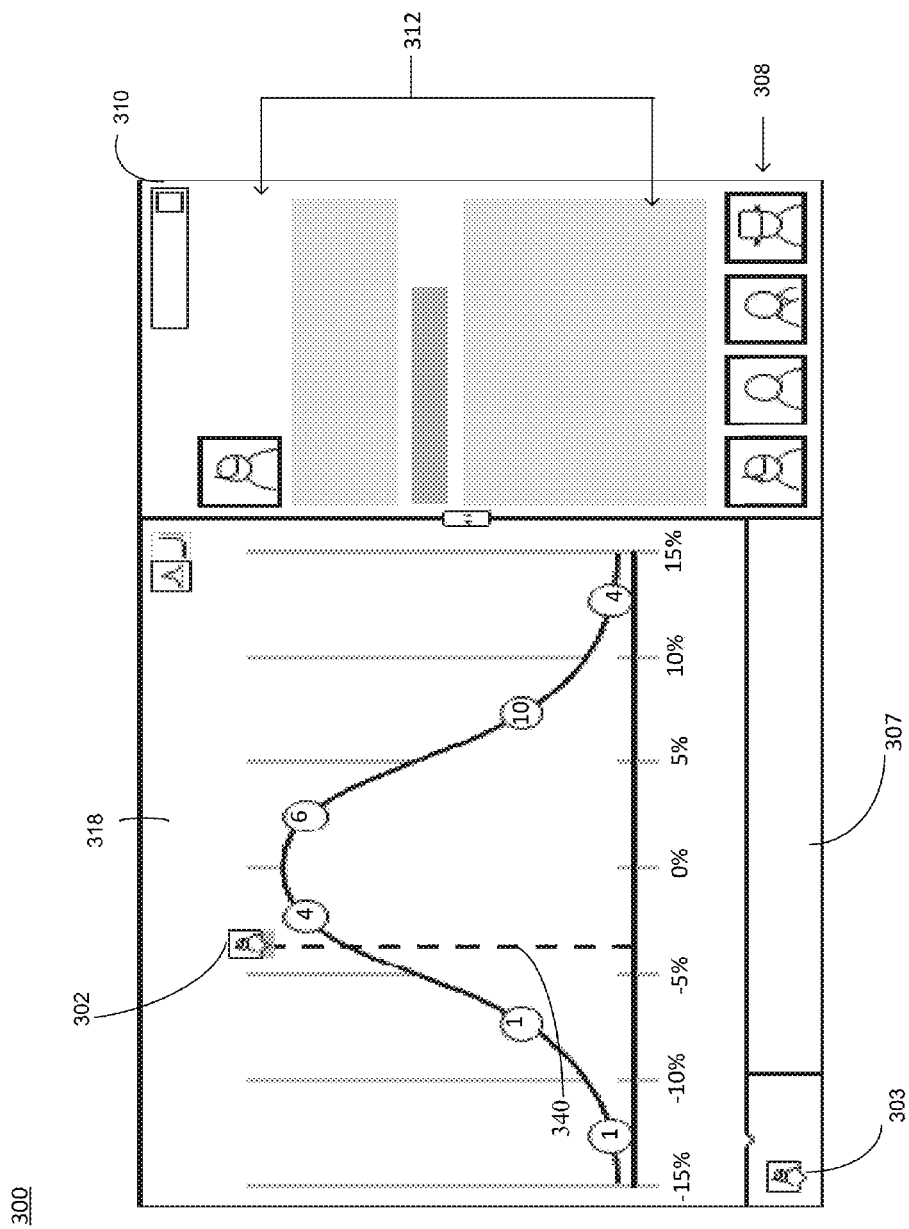

FIG. 4A shows a start screen of UI 300, which may display the key user's descriptive profile in information area 312, and which may list entities available for comparison in bar 308. Compare bar 307 may display key user 302 tab or icon at all times as a primary logged-in user. The key user's investment results may be highlighted or otherwise indicated on graph 316 using appropriate symbols or marks. FIG. 4A shows, for example, the key user's investment results marked at about −4% on horizontal axis 320 by dashed line 340 bearing key user 302 icon.

Figure 4B:
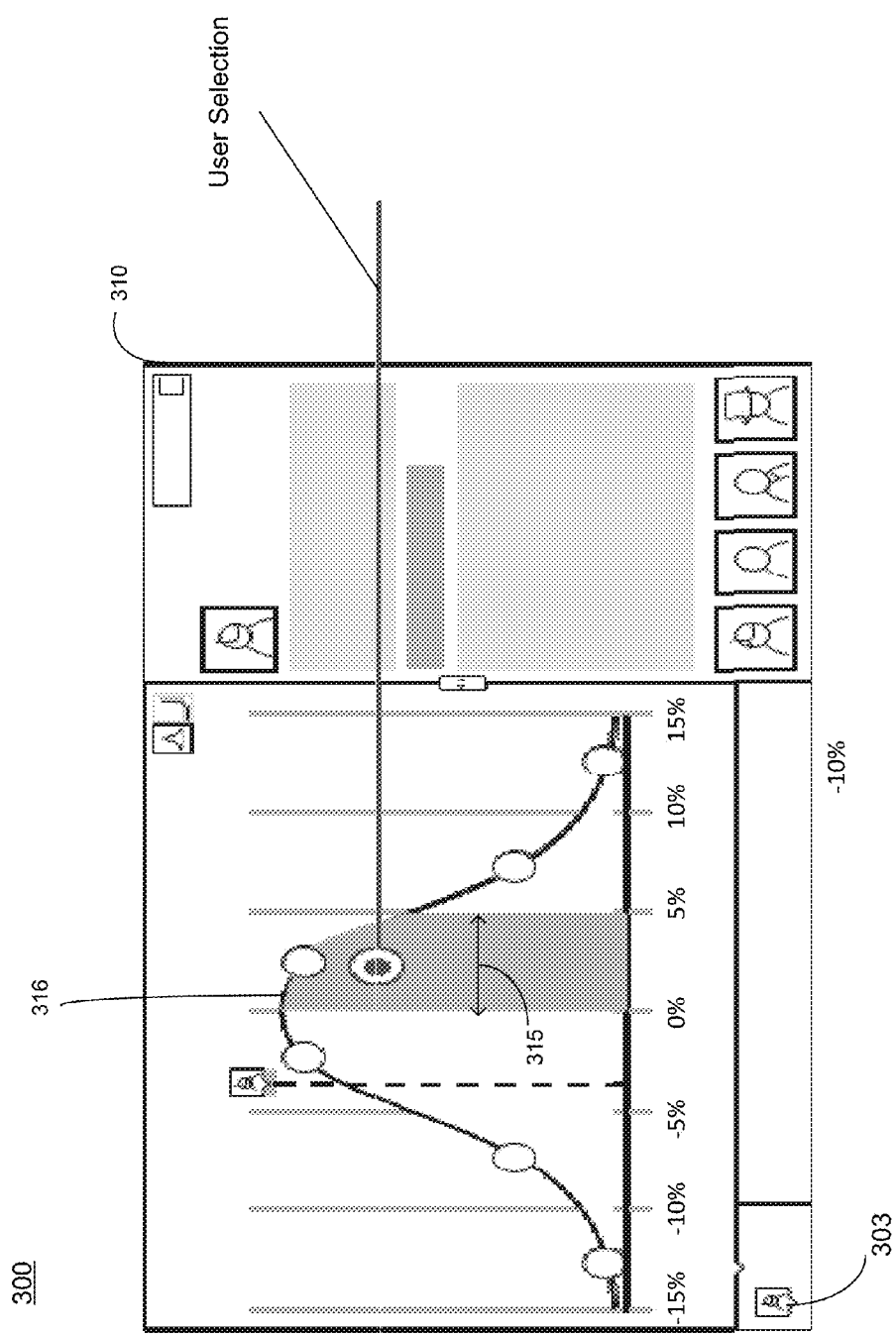
Figure 4C:
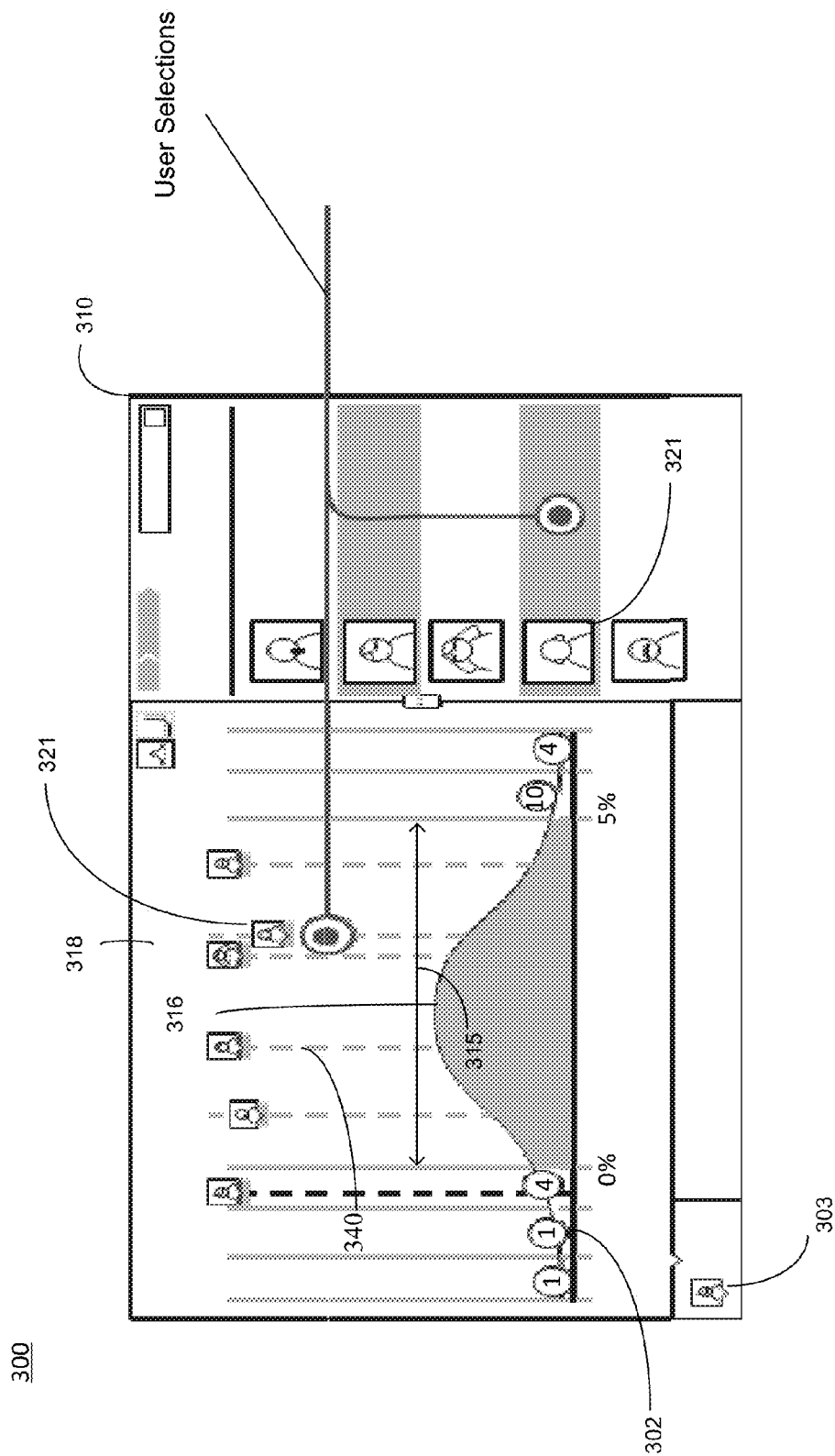

Next, as shown in FIG. 4B, the key user may select a market sector 315 (e.g., the 0%-5% sector, which counter 319 indicates has six users) for exploration. The key user may activate the selection, for example, by pointing-and-clicking on the selected market sector 315 as shown, or by using another input device (e.g. keyboard) (not shown). In response, UI 300 may display profile information for selected sector 315 on panel 310, and also expand a portion of graph 316 to show more detailed data for selected market sector 315. FIG. 4C shows, for example, sector 315 profile information displayed on panel 310. The displayed sector information may, for example, list the six entities (where six is the number indicated on counter 319 in the previous figure) for selected market sector 315. FIG. 4C also shows, for example, an expanded portion of graph 316 displaying more detailed data for selected market sector 315. In the expanded portion of graph 316 the investment results of the six entities are individually marked along horizontal axis 302 by dashed lines 340 bearing with respective picture icons.

Figure 4E:
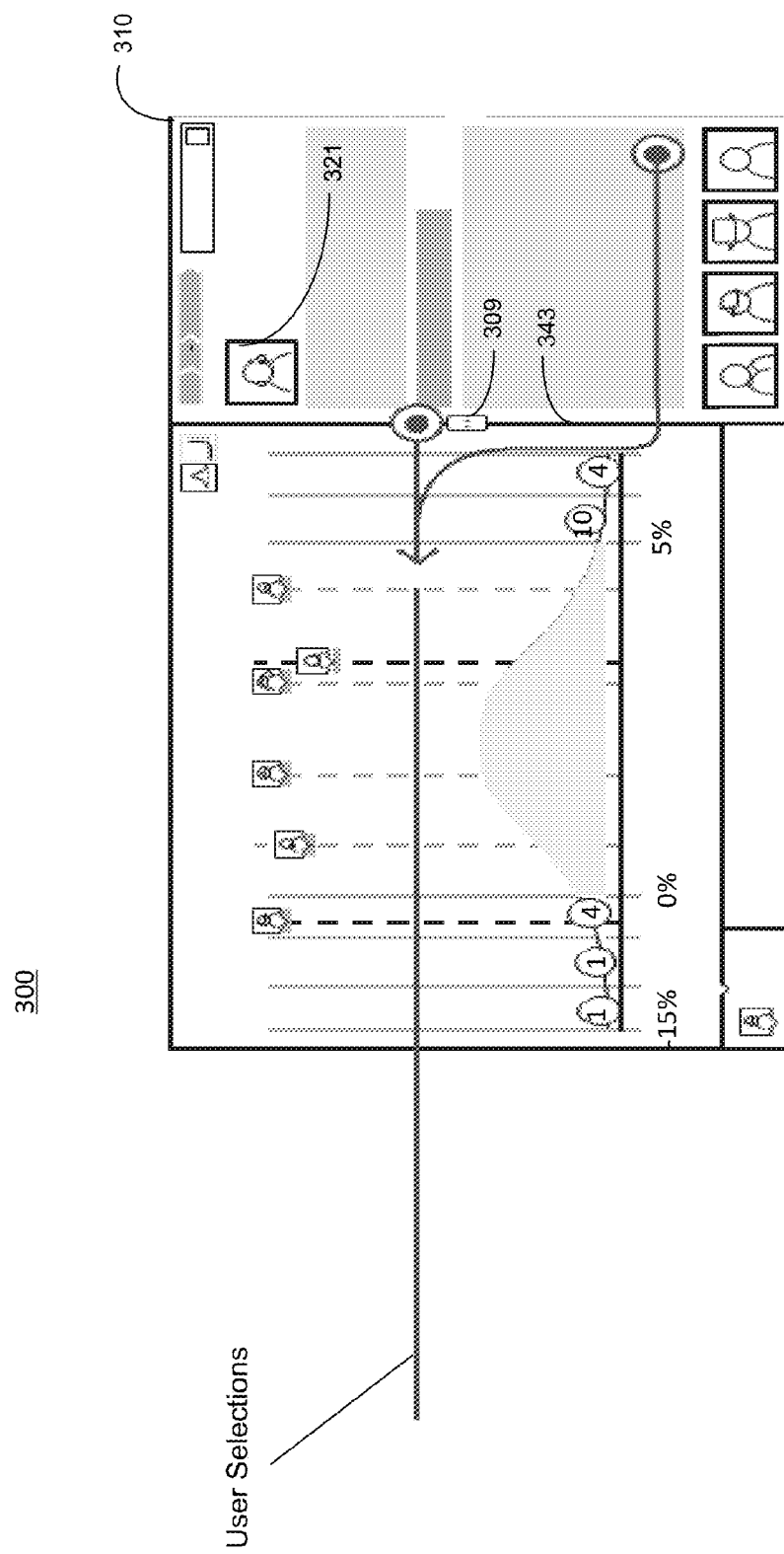
Figure 4F:
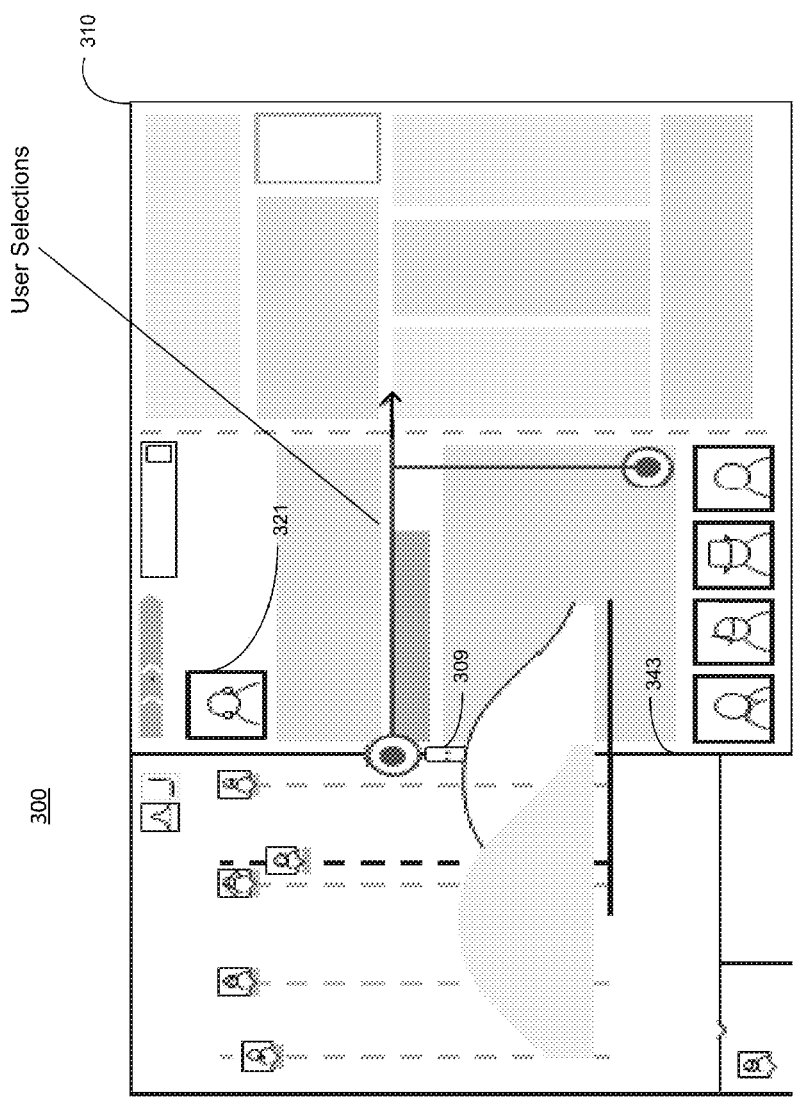

Next, the key user may be interested in viewing more details about a particular one of the six users, for example, fifth user 321). For this purpose, as shown in FIG. 4C. the key user may select fifth user 321 icon from either main area 318 or entities bar 308. In response, UI 300 may display profile information for the selected fifth user on panel 310, as shown in FIG. 4D. Next, the key user, interested in viewing even more detailed information on the selected fifth user 321, may choose to expand panel 310 to view more profile information. The key user may expand panel 310 by moving handle 309 to pull panel edge 343 outward to the left, as shown in FIG. 4E. An expanded panel 310 displaying additional profile information for the selected fifth user 321 is shown in FIG. 4F. The key user may choose to revert to the previous size of panel 310 to see less information by moving handle 309 to pull panel edge 343 inward to the right as shown in the figure.

Figure 4H:
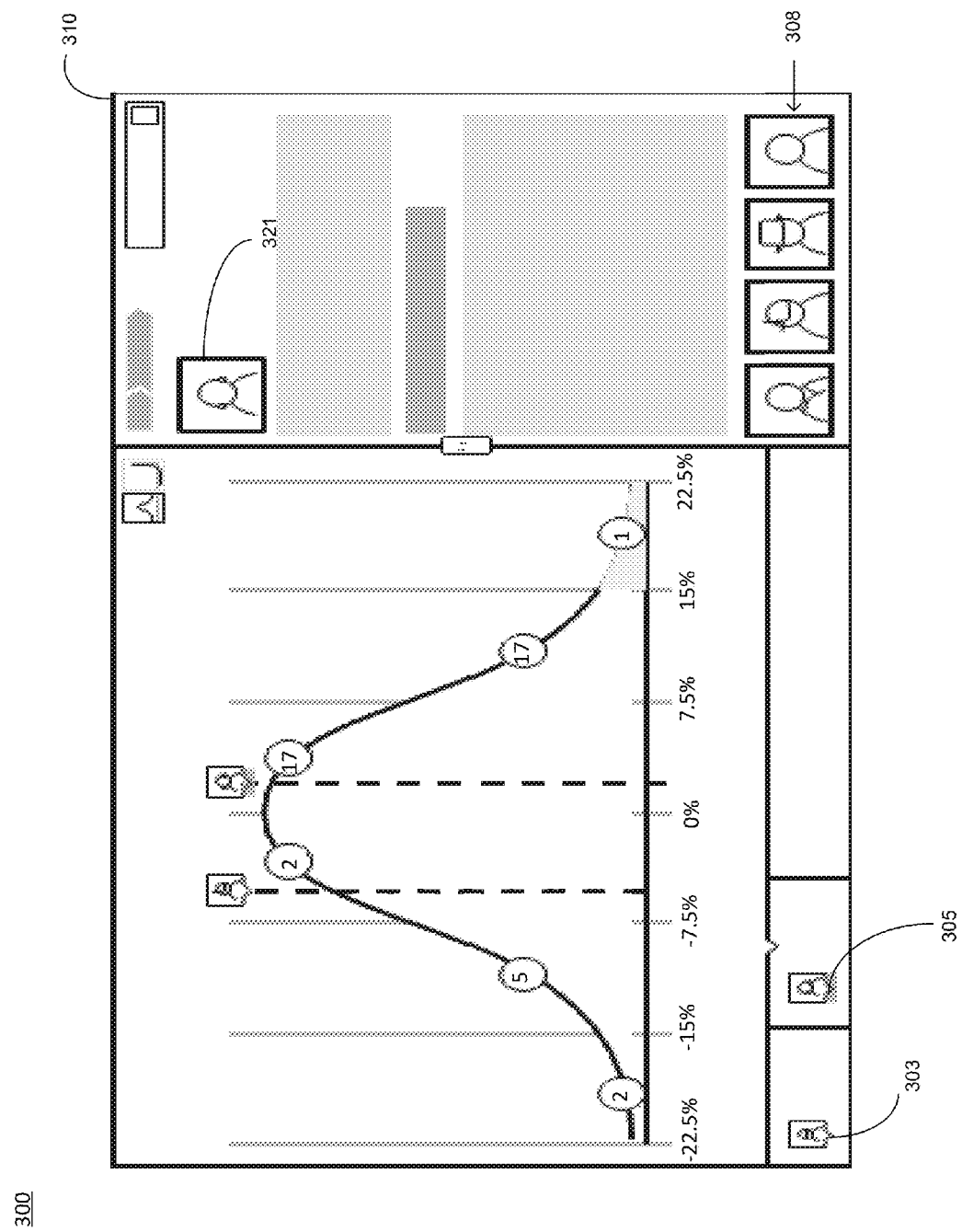

Next, the key user may decide to view or compare data from the perspective of the selected fifth user. For this purpose, as shown in FIG. 4G, the key user may add selected fifth user 321 icon to compare bar 307. The key user may, for example, drag selected fifth user 321 icon from either main display 318 or panel 310, and drop the icon in drop zone 306 of compare bar 307 as shown in the figure. In response, UI control 300 may redraw graphical representation 316 to show data from the selected fifth user's perspective as shown in FIG. 4H. UI control 300 may also add entities belonging to the selected fifth user's network to the list of selectable entities displayed in bar 308 of panel 310.

Figure 4I:
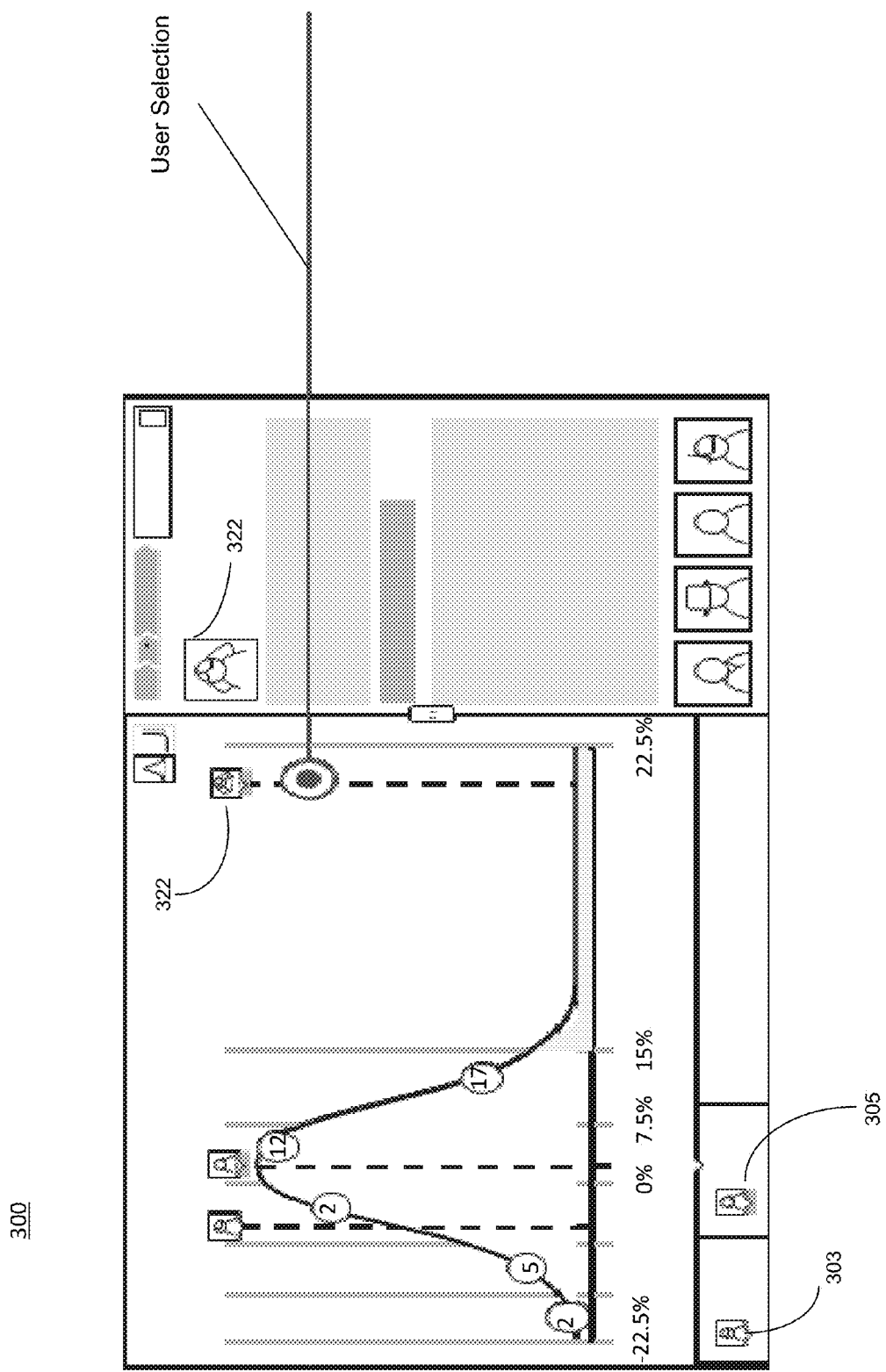

Thus, UI 300 may make a platform available to the key user to further interactively explore data in presentation 160 from the fifth user's perspective. The key user may, for example, investigate a sector 315 in graph 316 that shows better investment results than the selected fifth user's results, by selecting the sector and expanding sector data in graph 316 in the same or similar manner as described above with reference to FIGS. 4B-4D. The key user may further explore presentation 160 from the selected fifth user's perspective by, for example, seeing entities/persons on the fifth user's social network, identifying entities that are common or not common with the key user's own social network, and comparing the key user's investment results with one or more entities on the fifth user's social network, etc. FIG. 4I shows, for example, a selection of a sector and an entity (e.g., super investor 322) by the key user for further exploration of presentation 160. The key user may further progressively explore presentation 160 from the perspective of other entities in the same or similar manner as the key user's progress from the fifth user's perspective to the special investor's perspective described with reference to FIGS. 4A-4I above.

The data exploration scenarios using UI 300 that are described above with reference to FIGS. 4A-4I are only illustrative examples. It will be understood that data visualization solution 100 and UI 300 are not limited to the example scenarios described herein, and that data visualization solution 100 can more generally facilitate exploration of data set 140 from different perspectives and facilitate presentation of information beyond the strict filter requirements of an initial user search query.

FIG. 5 shows an example computer-implemented method 500 for data exploration and visualization. Method 500 includes retrieving filtered data that conforms to parameter(s) in a key entity's search query (510), determining a query context for the search query (520), and retrieving relevant data that conforms to the query context but does not conform to parameter(s) in the search query (530). Method 500 also includes combining the filtered data and the relevant data, and associating or identifying one or more sectors and/or entities with a portion of the combined data from a perspective of the key entity's search query (540). Method 500 further includes generating an interactive presentation to display the portion of the combined data from the perspective of the key entity's search query on a display (550), and further, in response to user-selection of a particular sector or entity associated or identified with the displayed portion of the combined data, changing the presentation to display another portion of the combined data from a perspective of the user-selected particular sector or entity (560).

In method 500, associating or identifying one or more sectors and/or entities with a portion of the combined data from a perspective of the key entity's search query (540) may include associating or identifying one or more entities from an electronic or Internet network to which the key user belongs with the portion of the combined data.

Further, in method 500 changing the presentation to display another portion of the combined data from a perspective of the user-selected particular sector or entity (560) may include associating or identifying one or more sectors and/or entities with the another portion of the combined data from the perspective of the user-selected particular sector or entity. The entities identified with the portion of the combined data may be from an electronic or Internet network to which the user-selected particular entity belongs.

In method 500, determining a query context for the search query (520), may include relaxing, broadening or loosening filter parameters in the user's search query. Further, determining a query context for the search query (520) may include using learning algorithms to learn the range or extent of the query context from other users' queries. Determining a query context for the search query (520) may also include determining or limiting the context according to the user-selected context criteria. These user-selected context criteria may include access to information on a network (e.g., a social or professional network) to which the user belongs. Method 500 may further include dynamically adjusting query contexts and updating presentations of information related to the query contexts.

In method 500, generating an interactive presentation of the portion of the combined data from the perspective of the key entity's search query on a display, may include generating a graphical representation of data and information to the user in appropriate formats for effective visualization of data and relationships in the data.

The various systems, apparatus or techniques described herein may be implemented in digital electronic circuitry, or in computer hardware, firmware, software, or in combinations of them. The systems, apparatus and techniques may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems, apparatus or techniques may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method, comprising:
   retrieving filtered data that conforms to parameter(s) in a user's search query;
   determining a query context for the user's search query;
   retrieving relevant data that conforms to the query context;
   combining the relevant data and the filtered data,
   the combined relevant and filtered data including one or more data sectors or entities;
   generating an interactive presentation to display a portion of the combined relevant and filtered data from the perspective of a data sector or entity associated with the user's search query; and
   in response to user-selection of another data sector or entity in the combined relevant and filtered data,
   changing the presentation to display another portion of the combined relevant and filtered data from a perspective of the user-selected another data sector or entity in the combined relevant and filtered data.

2. The method of claim 1, wherein determining a query context for the user's search query includes relaxing filter parameters in the search query.

3. The method of claim 1, wherein determining a query context for the user's search query includes using learning algorithms to learn the range or extent of the query context from other search queries.

4. The method of claim 1, wherein determining a query context for the user's search query includes determining or limiting the query context according to user-selected context criteria.

5. The method of claim 1, wherein determining a query context for the user's search query includes using information on an electronic or Internet network to which the user belongs.

6. The method of claim 1, further comprising, dynamically updating query context and updating presentations of information related to the query contexts.

7. The method of claim 1, wherein the data sector or entity associated with the user's search query includes at least an entity from an electronic or Internet network to which the user belongs.

8. The method of claim 1, wherein changing the presentation to display another portion of the combined relevant and filtered data from the perspective of the user-selected another data sector or entity includes associating at least a data sector and/or entity with the another portion of the combined data from the perspective of the user-selected another data sector or entity.

9. The method of claim 8, wherein associating at least a data sector and/or entity with the portion of the combined data from the perspective of the user-selected another data sector or entity includes associating an entity from an electronic or Internet network to which the user-selected another entity belongs.

10. A system, comprising:
a processor and a memory supporting a physical or virtual computer;
a data visualization solution hosted on the physical or virtual computer; and
a user-interface that is communicatively linked to data visualization solution,
wherein the data visualization solution is configured to:
in response to a user's search query,
retrieve filtered data that conforms to filter parameter(s) in the user's search query;
determine a query context for the user's search query;
retrieve relevant data that conforms to the query context but does not conform to the filter parameter(s) in the user's search query;
combine the relevant data and the filtered data, the combined data including one or more data sectors or entities;
make an interactive presentation to display a portion of the combined data from the perspective of a data sector or entity associated with the user's search query; and
in response to user-selection of another data sector or entity in the combined relevant and filtered data,
change the presentation to display another portion of the combined data from the perspective of the user-selected another data sector or entity in the combined relevant and filtered data.

11. The system of claim 10, wherein the data visualization solution is configured to determine the context of the user's search query by relaxing data filter parameters in the user's search query.

12. The system of claim 10, wherein the data visualization solution is configured to determine the context of the user's search query automatically based on the user's search query.

13. The system of claim 10, wherein the data visualization solution is configured to determine a context of the user's search query by based on user-selected context criteria.

14. The system of claim 10, wherein the data visualization solution is configured to determine the context of the user's search query by using learning algorithms to learn a range or extent of the context from other user queries.

15. The system of claim 10, wherein the data visualization solution is configured to determine the context of the user's search query by using information from an electronic or Internet network to which the user belongs.

16. The system of claim 10, wherein the data visualization solution is configured to dynamically update query context and update presentations of information related to the query contexts.

17. The system of claim 10, wherein the data visualization solution is configured to associate at least a data sector or entity from an electronic or Internet network to which the user belongs with the portion of the combined data.

18. The system of claim 10, wherein the data visualization solution is configured to associate at least a data sector or entity with the portion of the combined data in the presentation from the perspective of the user-selected another data sector or entity.

19. A computer program product comprising non-transitory computer-readable media that includes executable code, which when executed:
retrieve filtered data that conforms to parameter(s) in a user's search query;
determine a query context for the user's search query;
retrieve relevant data that conforms to the query context but does not conform to parameter(s) in the user's search query;
combine the relevant data and the filtered data, the combined data including one or more data sectors or entities;
make an interactive presentation of a portion of the combined data from the perspective a data sector or entity associated with the user's search query; and
in response to user-selection of another data sector or entity of the combined data,
change the presentation to another portion of the combined data from the perspective of the user-selected another data sector or entity in the combined relevant and filtered data.

20. The computer program product of claim 19, which further includes executable code, which when executed:
identifies at least a data sector or entity from an electronic or Internet network to which the user belongs with the portion of the combined data; and
associates at least a data sector or entity from an electronic or Internet network to which the user-selected entity belongs with the portion of the combined data in the changed presentation from the perspective of the user-selected another data sector or entity.

* * * * *